Oct. 22, 1940. A. L. W. WILLIAMS Re. 21,607

METHOD AND APPARATUS FOR GENERATING ELECTRICAL WAVES

Original Filed June 27, 1935 4 Sheets-Sheet 1

INVENTOR:
Alfred L. W. Williams
BY Roy A. Fuller
ATTORNEY

METHOD AND APPARATUS FOR GENERATING ELECTRICAL WAVES

Original Filed June 27, 1935 4 Sheets-Sheet 2

INVENTOR:
Alfred L. W. Williams
BY Ray S. Fuller
ATTORNEY

METHOD AND APPARATUS FOR GENERATING ELECTRICAL WAVES

Original Filed June 27, 1935 4 Sheets-Sheet 3

INVENTOR:
Alfred L. W. Williams
Ray A. Fisher
ATTORNEY

Oct. 22, 1940. A. L. W. WILLIAMS Re. 21,607

METHOD AND APPARATUS FOR GENERATING ELECTRICAL WAVES

Original Filed June 27, 1935 4 Sheets-Sheet 4

INVENTOR:
Alfred L. W. Williams
BY Ray S. Kelly
ATTORNEY

Reissued Oct. 22, 1940

Re. 21,607

UNITED STATES PATENT OFFICE 21,607

METHOD AND APPARATUS FOR GENERATING ELECTRICAL WAVES

Alfred L. W. Williams, Cleveland, Ohio, assignor to The Brush Development Company, Cleveland, Ohio, a corporation of Ohio Original No. 2,126,437, dated August 9, 1938, Serial No. 28,746, June 27, 1935. Application for reissue August 19, 1939, Serial No. 291,074

23 Claims. (Cl. 179—135)

The invention relates to methods and apparatus for generating electrical waves corresponding to fluid medium waves, such for example as sound waves, and particularly methods and apparatus in which there is a selective action with respect to the direction from which the fluid medium waves approach.

An object of the invention is to provide an improved method of generating electrical waves corresponding to fluid medium waves in which the amplitude of the electrical waves generated varies with the direction of approach of the fluid medium waves.

More specifically, a further object of the invention is to provide an improved method of generating electrical waves corresponding to fluid medium waves in which the amplitude of the electrical waves generated varies with the direction of approach of the fluid medium waves from a maximum in one direction to a minimum in the opposite direction.

Another object of the invention is to provide improved apparatus suitable for use in carrying out methods such as those above referred to.

A further object of the invention is to provide a microphone having uni-directional operating characteristics.

Still another object of the invention is the provision of a microphone adapted to operate alternatively with uni-directional, non-directional, or bi-directional characteristics.

Another object of the invention is the provision of a microphone having uni-directional operating characteristics and further characterized by a flat response throughout a relatively wide range of frequencies.

A further object of the invention is the provision of microphones having operating characteristics such as above referred to and which are further characterized by structural simplicity, compactness, light weight and relatively low cost of production.

My improved methods involve essentially utilizing the different instantaneous wave pressures of the fluid medium in suitably disposed adjacent zones to generate electrical waves whose instantaneous values are proportional to the differences between the said pressures. For fluid medium waves approaching the said zones in two opposite directions the differences in instantaneous pressures are at a maximum while for fluid medium waves approaching from intermediate directions the differences in pressure between the two zones are at a minimum for directions of approach midway between the first named directions. Thus the generation of electrical waves is selective with respect to the direction of approach of the fluid medium waves with a maximum generation or response in two opposite directions. By utilizing the pressure variations of the fluid medium in a third zone, suitably disposed in relation to the two other zones, to generate corresponding electrical waves and properly combining the latter set of waves with the set of waves generated by the different instantaneous pressures in the two other zones so that the combined waves are in phase, and therefore additive, when generated by fluid medium waves approaching from one direction and are substantially 180° out of phase, and therefore subtractive, when generated by fluid medium waves approaching from the opposite direction, there is secured an electrical response that is unidirectional with respect to the fluid medium waves. The phase angle between the two said sets of waves is substantially greater than zero and substantially less than 180°. Accordingly, in order to combine the waves properly so that unidirectional response will be obtained, it is necessary to shift the phase angle between the two sets of waves so that the waves of the two sets shall have the above mentioned in-phase relation for fluid medium waves approaching from one direction and 180° out-of-phase relation for fluid medium waves approaching from the opposite direction. This is accomplished by passing either of the said sets of waves through a suitable phase shifting electrical circuit. Preferably the method further involves passing the electrical waves generated by the different instantaneous pressures in two of the zones through a circuit whose transmission efficiency varies inversely as the frequency for the range of frequencies utilized so that the electrical response secured is relatively flat.

My improved apparatus comprises a generator having two diaphragms suitably disposed adjacent each other so that their movements in response to different instantaneous pressures of the fluid medium waves generate electrical waves having the bi-directional characteristics above referred to. And, in order to secure the uni-directional response characteristics above referred to the apparatus includes another generator having a diaphragm exposed and sensitive to the fluid medium waves. Further the apparatus preferably includes a circuit to which the generators are connected and which has, within the frequency range for which the apparatus is designed, a transmission efficiency for waves from the two-diaphragm generator varying inversely with the frequency and which circuit is adapted to shift the phase angle between the output voltage waves which is adapted to combine the electrical waves of the two generators so that they are substantially 180° out of phase for fluid medium waves approaching from one direction and substantially in phase for fluid medium waves approaching from the opposite direction, and is also adapted to combine the said voltage waves in the latter phase relations.

My improved methods and apparatus may most conveniently be described and explained in detail in conjunction with each other and I shall now describe the preferred and alternative forms of the apparatus illustrated in the accompanying drawings and explain my improved methods as carried out by the use of the said apparatus. The known types of microphone generators, such as the piezo-electric, dynamic, condenser and carbon types, may be employed in carrying out my invention, although I prefer to make use of the sound cell type of piezo-electric generators because of their remarkable compactness and fidelity of response over a wide range of frequencies.

In the accompanying drawings, Fig. 1 is a side elevation of a preferred form of my improved microphone in which piezo-electric generators are employed.

Figure 7:
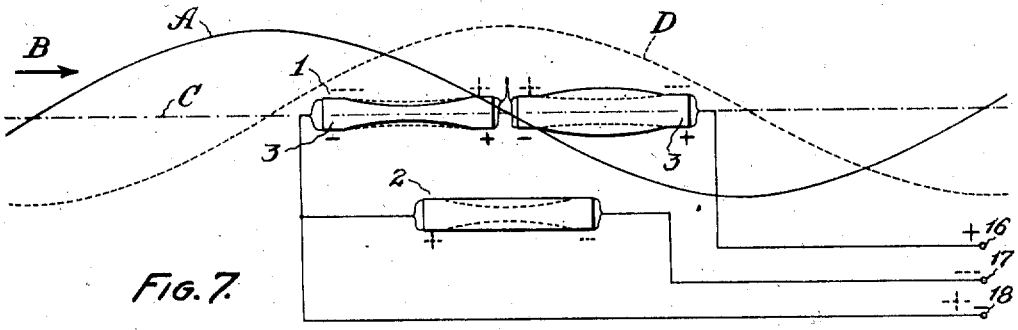
Figs. 7 and 8 are diagrammatic views showing certain of the microphone generator units and the manner in which the fluid medium waves act upon said units.
Figure 8:
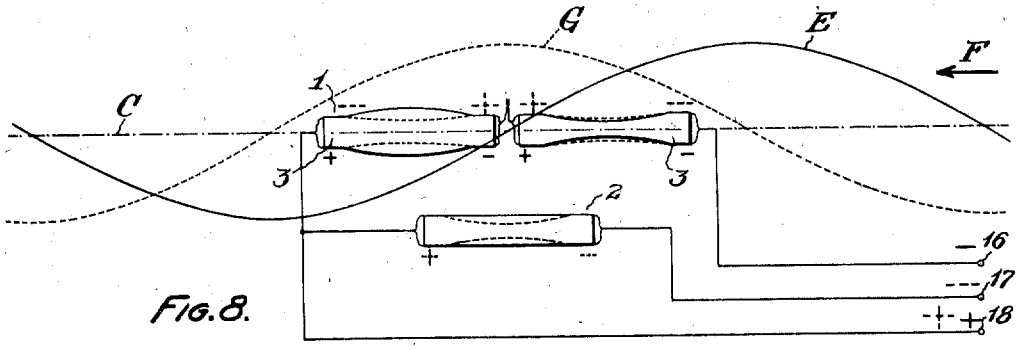
Figure 14:
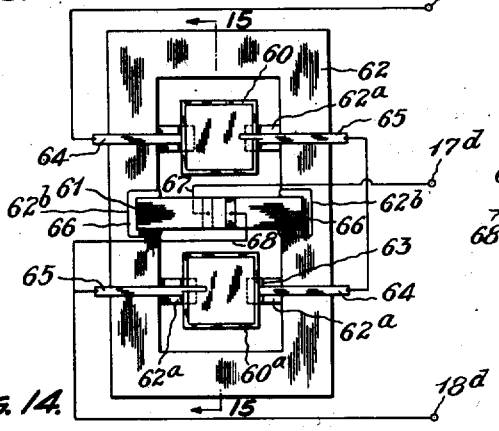
Fig. 14 is a front elevation of still another form of microphone utilizing piezo-electric generating units and embodying my invention.
Figure 15:
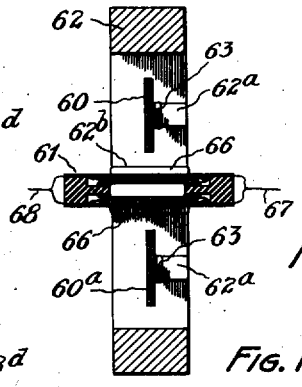
Fig. 15 is a section on the line 15—15 of Fig. 14.
Figure 17:
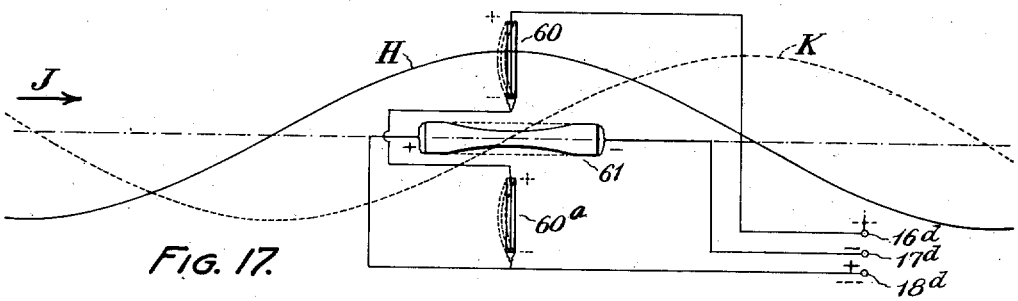
Figure 18:
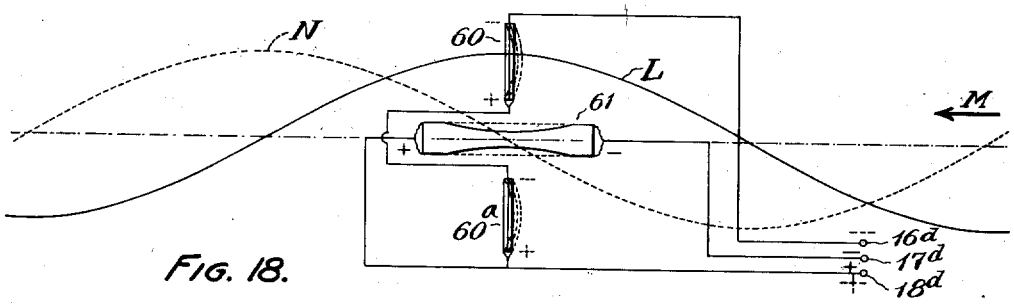

Figs. 17 and 18 are diagrams corresponding to Figs. 7 and 8 but applicable to the form of microphone shown in Figs. 14 and 15.

Figure 19:
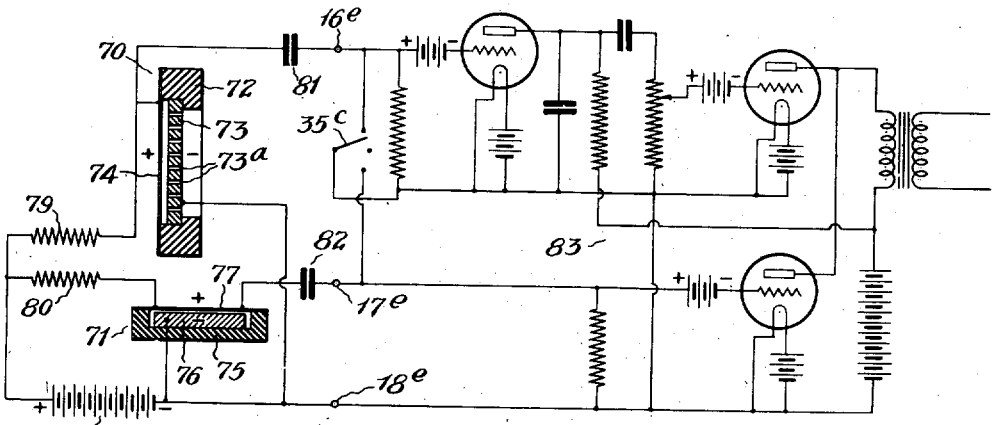

Fig. 19 is a diagram showing another form of microphone having condenser type generator units embodying the improved features of my invention together with a circuit comprising amplifying and modifying devices to which the microphone is connected.

Figure 20:
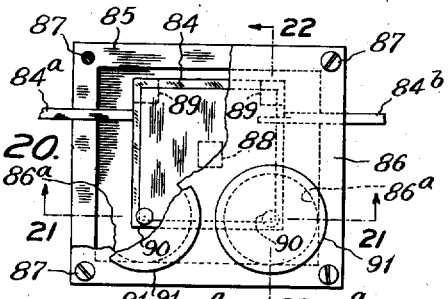

Fig. 20 is a plan view of another form of piezo-electric microphone suitable for use in carrying out my invention, with a portion of the structure broken away to better show details of construction.

Figure 21:
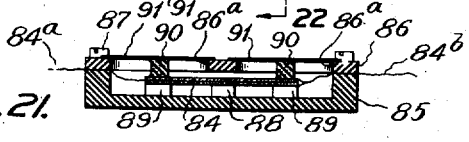

Fig. 21 is a section on the line 21—21 of Fig. 20.

Figure 22:
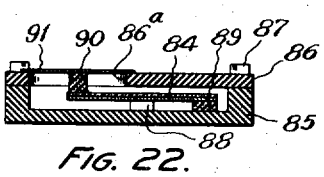

Fig. 22 is a section on the line 22—22 of Fig. 20.

Referring first to Figs. 1 to 6, the microphone comprises two identical generators designated in their entireties by 1 and 1a and a third generator designated in its entirety by 2. The generator 2 consists of a piezo-electric sound cell generator unit such as is fully shown and described in the application for United States Letters Patent of C. B. Sawyer, Serial No. 658,649 filed February 25, 1933, now Patent No. 2,105,010, issued Jan. 11, 1938, and in British Letters Patent No. 409,040. Each of these disclosures presents full details of the construction and it will suffice for the purposes of the present invention to state that the sound cell generating unit which is designated in its entirety by the numeral 3 comprises a frame structure 4 of Bakelite or the like having two inwardly extending lugs 4a upon the opposite sides of which are supported two plate-like crystalline piezo-electric generating elements 5, 5a of the flexing type. The crystal elements 5, 5a are secured in place and tightly sealed within the frame by thin sheets 6, 6a of paper or the like which are cemented to the faces of the crystal elements and the frame. The electrodes of one polarity of the elements 5, 5a are connected by conductors 7 and 7a, respectively, to a common conductor 8, while their electrodes of the opposite polarity are connected by conductors 9, 9a to a common conductor 10. The flexible crystal elements 5, 5a and their respective paper sheets 6, 6a constitute in effect oppositely facing diaphragms of the crystal unit sensitive to the pressure of surrounding fluid medium.

Figure 3:
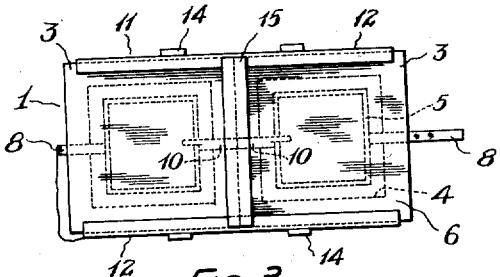
Fig. 3 is a plan view of the said microphone.
Figure 1:
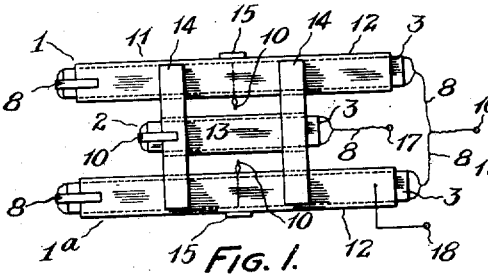

Each of the generators 1, 1a comprises two of the sound cell generator units 3 disposed side by side in horizontal alignment and connected in electrical opposition. The two units of each of the generators 1, 1a and of the generator 2 are supported in the relative spaced positions indicated in Figs. 1, 2 and 3 by a frame structure designated in its entirety by 11 and comprising two pairs of channels 12, 12 which support the generators 1 and 1a, and a pair of shorter channels 13, 13 which support the generator 2, upright plates 14, 14 and cross strips 15. All of said channels and strips are welded or soldered together to produce a frame of sufficient rigidity to properly support the generating units. When the said units are assembled in the frame the generating units of the generators 1 and 1a are connected in electrical opposition by joining their conductors 10 as shown in Figs. 1 and 3. The conductor 8 of one generating unit of each generator 1 and 1a may then conveniently be grounded on the frame 11 and the terminal conductor 10 of the generator 2 may similarly be grounded. The microphone has three terminals 16, 17 and 18, the terminal 16 being connected to two of the conductors 8 of the generators 1 and 1a, the terminal 17 being connected to the conductor 8 of the generator 2 and the terminal 18 being connected to the grounded frame 11.

Figure 2:
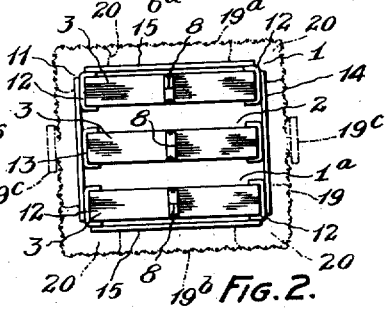
Fig. 2 is a front elevation of the same with a foraminous supporting and enclosing casing shown in dotted lines.

The microphone generators and their supporting frame are mounted in a supporting and protecting casing shown by dotted lines in Fig. 2 and designated in its entirety by 19. This casing preferably comprises top and bottom sections 19a, 19b, respectively, which are joined by a band 19c which extends horizontally around the casing. The frame 11 is suitably supported in the casing by blocks 20, 20 of felt, sponge rubber or the like. The casing parts 19a, 19b are made of wire screen or other foraminous material so as to freely admit the air or other fluid medium.

Figure 6:
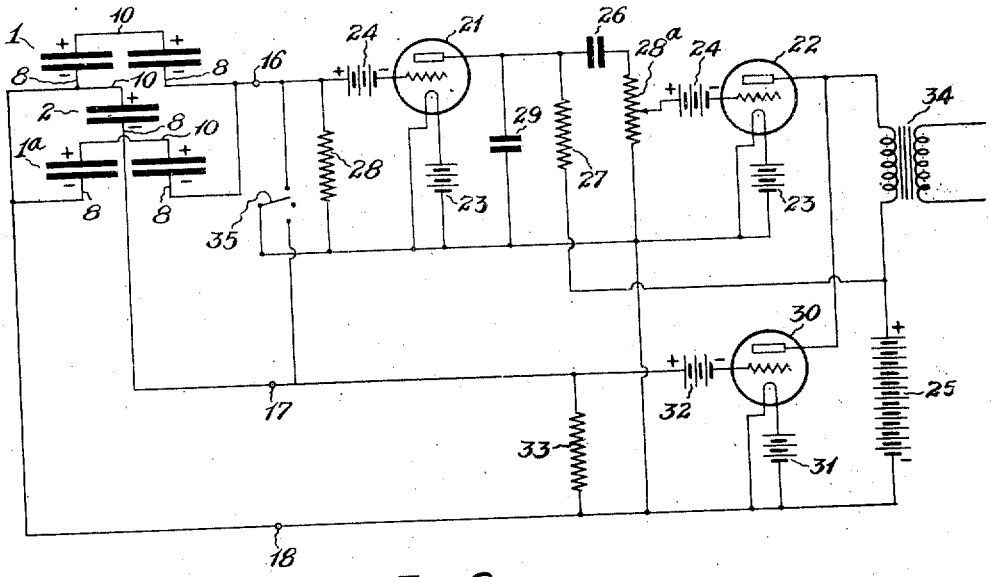
Fig. 6 is a diagram showing the microphone and a circuit, comprising suitable amplifying and modifying devices, with which the microphone may be connected in use.

In the use of the microphone shown in Figs. 1, 2 and 3 and above described, it preferably is connected with a circuit comprising suitable modifying devices and preferably also suitable amplifying devices. Such a circuit is illustrated in Fig. 6. As shown in Fig. 6 the terimnal 16 of the microphone is connected to a two-stage amplifier comprising vacuum tubes 21 and 22 and their conventional associated filament-supply batteries 23, 23, grid-bias batteries 24, 24, and plate-supply battery 25, grid-blocking condenser 26, plate-coupling resistance 27 and grid-leak resistances 28, 28a. In addition a condenser 29 is connected between the plate and filament of the tube 21 and serves a purpose which will later be explained. Terminal 17 of the microphone is connected to an amplifying tube 30 which is provided with filament and grid batteries 31 and 32, respectively, and a grid-leak resistance 33 and is also connected with plate-supply battery 25 through a transformer 34 which is a common coupling device for the two amplifiers. Transformer 34, in addition to coupling together the two amplifying circuits, provides means for conducting the amplified waves to a loud speaker, phonograph recorder or any other device with which microphones are associated. Terminal 18 is common to the cathodes of the two amplifying circuits. A three-position switch 35 is provided to short circuit generator 2 or generators 1 and 1a to alter the directional characteristics of the apparatus as will later be more fully explained.

While I have shown, in Fig. 6, an amplifier circuit embodying three tubes of the triode type with directly heated cathodes and with separate filament and grid batteries, it will be understood that other known types of tubes and sources of operating potential may be employed. For instance, the tubes may be of the indirectly heated or heater type and, if desired, heated by alternating current. Furthermore they may be of the screen grid or pentode type and two or more tube functions may be combined within a single tube envelope. Also a common battery or other source of potential may be used to supply all of the tubes and the grid bias may be obtained from the voltage drop caused by the plate current flowing through a resistance. Similarly, other expedients well known in the art may be employed in lieu of the arrangements shown in Fig. 6.

In explaining the operation of the apparatus above described, it may at the outset be assumed that the switch 35 is set in open position as shown in Fig. 6. The manner in which the fluid medium waves act upon the generators 1, 1a and 2 is illustrated in part by Figs. 7 and 8. In these two figures the generator 1a is omitted as it is a duplicate of the generator 1 and functions in the same manner both when considered alone and when considered in combination with the generator 2.

In the operation of the microphone, within a relatively wide range of frequencies, the unitary generator 2 responds substantially uniformly to fluid medium waves approaching from any direction, the range of frequencies depending chiefly upon the dimensions of the generator. The same thing is true of the individual generator units 3, 3 of the generator 1 (and 1a) but the generator 1 as an entirety has decidedly directional operating characteristics due to the physical arrangement of its generating units and the opposed electrical connection of the later.

This will now be explained with reference to the diagrams of Figs. 7 and 8. In these figures the generating units 3, 3 of generator 1 and the generator 2 are so arranged and connected that when they are all subjected to fluid medium pressure above zero, the left hand lead of the left hand unit 3 of generator 1 is negative with respect to its other lead and the right hand lead of the right hand unit 3 of generator 1 is negative with respect to its other lead and the left hand lead of generator 2 is positive with respect to its other lead. In other words, the polarity of the left hand unit 3 of generator 1 is reversed with respect to the polarities of the other two units. The dotted polarity signs associated with generators 1 and 2 indicate this relation. In Fig. 7, graph A illustrates the pressure distribution of a fluid medium wave approaching the microphone from the direction indicated by the arrow B. The abscissae of the graph represent space distribution and the ordinates fluid medium pressure above or below zero pressure, which is shown by the axis C. By "zero pressure" I mean the pressure of the fluid medium when the latter is quiescent. This pressure distribution is shown at the instant when the pressure at the center of generator 1 is zero. Left hand unit 3 is in a zone of compression and right hand unit 3 is in a zone of rarification. The effect of increased pressure on the left hand unit is indicated by the concave shape of its faces shown in full lines. The faces of right hand generating unit 3 are shown convex because it is in a zone of reduced pressure. Since the two units 3, 3 are, as above described, arranged and connected to have opposed polarities when subject to fluid medium pressure above (or below) zero, the output of generator 1 is proportional to the difference in pressure on the units 3, 3 and is maximum at the instant shown, with a positive potential at terminal 16. The plus and minus signs shown in solid lines indicate the relative polarities of the generating units when they are influenced by the pressure wave A. At the instant shown generator 2 is in a zone of zero pressure and hence its faces are shown (by solid lines) in normal position. Since the average pressure acting on generator 2 at this instant is zero no voltage is generated by it and no polarity signs are shown. Dotted line D is a graph of the pressure distribution one quarter cycle later or in other words after the wave has progressed in direction B for a distance of one quarter wave length. Units 3, 3 of generator 1 are now acted upon by equal pressures and the faces are shown slightly concave in dotted lines. Due to the opposed electrical connection of units 3, 3 their outputs at the instant shown cancel each other and there is no difference of potential between terminals 16 and 18. Generator 2 is now in the zone of maximum pressure and the positions of its faces are shown by the concave dotted lines. The output of generator 2 is maximum at this instant and its polarities are shown in dotted lines.

From the foregoing paragraph it can be seen that, for the connections and direction of fluid medium waves shown in Fig. 7, when terminal 18 is taken as a reference point, terminal 17 reaches a maximum negative potential one quarter cycle after terminal 16 reaches a maximum positive potential. In other words, the output of generator 1 (terminals 16 and 18) leads the output of generator 2 (terminals 17 and 18) by 270°, or lags said output by 90°.

By retarding the electrical wave of generator 1 until the fluid medium wave has progressed from position A to position D, which represents a distance of one quarter wave length, the outputs of generator 1 and generator 2 may be brought 180° out of phase with each other.

In Fig. 8 a similar wave E is illustrated approaching the same microphone from the opposite direction as indicated by the arrow F. The right hand generator unit of generator 1 at the instant represented is in a zone of compression and the left hand unit is in a zone of rarification, as indicated by the full line positions of the diaphragms of the generating unit. The output of generator 1 at this instant is of the same magnitude as shown for a similar wave in Fig. 7 but of opposite polarity due to the reversal of the pressures with respect to the units of generator 1. At the instant represented generator 2 is in a zone of zero pressure and its faces are shown in normal position in solid lines. At this instant no output is produced by generator 2 and so no polarity signs are shown.

Dotted line G represents the pressure distribution after the wave has progressed in a direction of the arrow for a distance of one quarter wave length. Generating units 3, 3 of generator 1 are now in equal pressure zones and the positions of their faces are shown somewhat concave by the dotted lines. At this instant the output of units 3, 3 are equal but due to the opposed connection of units 3, 3 the output of generator 1 is zero. At the instant illustrated generator 2 is in a zone of maximum pressure and the positions of its faces are shown as concave by dotted lines. Its polarity is also shown in dotted lines and is the same as for similar conditions in Fig. 7.

From consideration of the foregoing description and Fig. 8 it is apparent that when terminal 18 is taken as a reference point, the terminal 17 reaches a maximum negative potential one quarter cycle after terminal 16 reaches a maximum negative potential. In other words, the output of generator 1 (terminals 16 and 18) leads the output of generator 2 by 90°.

By retarding the electrical waves of generator 1 until the corresponding fluid medium waves have progressed from position E to position G, which represents a distance of one quarter wave length or a phase displacement of 90°, the outputs of generator 1 and generator 2 may be brought in phase with each other, whereas in Fig. 7 retarding the output of generator 1 by 90° brings the outputs 180° out of phase.

By electrically retarding the output of generator 1 and then combining the retarded output with the output of generator 2 the combined response to fluid medium waves may be made to vary as the direction of the waves is changed from a maximum for waves in one direction to a minimum for waves in the opposite direction. For waves arriving from direction B in Fig. 7 the retarded output of generator 1 will tend to cancel the output of generator 2, providing a minimum response. For waves arriving from direction F in Fig. 3 the retarded output of generator 1 will reenforce the output of generator 2, providing a maximum response. Reversing the polarity of generator 1 or generator 2 will reverse the directions of maximum and minimum response.

For fluid medium waves approaching the microphone from any direction at right angles to the directions indicated by arrows B and F of Figs. 7 and 8, units 3, 3 of generator 1 are affected equally and simultaneously and hence, due to their opposed connection, their outputs are cancelled and the output of the microphone is that of generator 2 alone. For fluid medium waves approaching the microphone in directions intermediate between those last referred to and the direction B the output will vary from that of the generator 2 to the minimum output for waves in the direction B. And similarly, for fluid medium waves approaching the microphone from directions intermediate between the direction at right angles to directions B and F and the direction F the output of the microphone will vary from the output of the generator 2 to the maximum output of the instrument for fluid waves approaching from the direction F.

As an alternative method of bringing the outputs into phase for waves from one direction and out of phase for waves from the opposite direction, the output of generator 2 may be retarded instead of the output of generator 1. In this case the outputs will oppose for waves arriving as shown in Fig. 8 and will aid each other for waves arriving as shown in Fig. 7. The directions of maximum and minimum response will then be reversed.

In the preceding paragraphs I have shown that the output of generator 1 depends on the instantaneous difference between pressures on the two units 3, 3 of said generator 1. Now if we consider one at a time the effects of successive sound waves, of different frequencies but of the same maximum instantaneous pressures, approaching generator 1 from either direction B or direction F, we find that the maximum instantaneous pressure difference will be very small for very long waves and will increase as the wave length decreases until the wave length equals twice the center to center distance between the units 3, 3. At this wave length, when one unit 3 is at a point of maximum pressure in the sound wave, the other unit 3 is at a point of minimum pressure and hence the pressure difference is maximum. As the wave length is further decreased the difference in pressure decreases and becomes zero when the wave length equals the said center to center distance.

For waves approaching from other directions the frequency of maximum response or maximum pressure difference depends on the apparent center to center spacing of the units 3, 3. Such spacing for waves from any direction is the distance a sound wave must progress in the given direction to travel from a point on one unit 3 of generator 1 to a corresponding point on the other unit 3 of generator 1. The apparent center to center spacing equals the true center to center spacing for sound waves arriving from direction B or direction F of Figs. 7 and 8 and approaches zero as the direction of the sound waves approaches the perpendicular to direction B or direction F.

Stated in another way, maximum response occurs for waves whose period is equal to twice the time required for sound waves to travel from a point on one unit 3 of generator 1 to a corresponding point on the other unit 3 of generator 1. As the period of the wave is further reduced the response drops, reaching zero when the period is equal to the time required for a wave to travel from a point on one unit 3 to a corresponding point on the other unit 3 of generator 1.

The above relation may be expressed in the form of equations. If we let $P_m$=maximum instantaneous wave pressure
$d$=apparent center to center spacing of units 3, 3
$Y$=wave length of the fluid medium waves $f$=frequency of the fluid medium waves$=\frac{1}{a}$ where
$a$=period of the wave
$P_d$=maximum instantaneous difference in pressure between corresponding points on units 3, 3 at frequency $f$
$v$=velocity of propagation in the fluid medium Then we have $$(1)\quad P_d=2P_m \sin\left(\frac{d}{Y}\times 180^\circ\right)$$

Or, since $Y=\frac{v}{f}$, we have $$(2)\quad P_d=2P_m \sin\left(\frac{d}{v}f\times 180^\circ\right)$$

Or, since $f=\frac{1}{a}$, we have $$(3)\quad P_d=2P_m \sin\left(\frac{d}{v}\times\frac{1}{a}\times 180^\circ\right)$$

The ratio $\frac{d}{v}$ is the time required for waves to progress from a point in one unit 3 to a corresponding point in the other unit 3.

As an example, assume that sound waves of various frequencies $f$ or periods $a$ approach generator 1 from direction B or direction F in Figs. 7 and 8, and assume that $d$ equals .578 inch, $v$ equals 13,000 inches per second, $P_m$ equals 1,000 units of pressure. Then the above formula reduces to $$P_d=2\times 1000 \sin\left(\frac{.578}{13{,}000}\times f\times 180^\circ\right)=2000 \sin(.008f)$$

and $$\frac{d}{v}=\frac{.578}{13{,}000}=.0000446$$

Tabulating values of $P_d$ against $f$ and $a$, we have

| $f$(cycles) | $a$ (seconds) | $P_d$ |
|---|---|---|
| 100 | .01 | 28 |
| 200 | .005 | 56 |
| 400 | .0025 | 112 |
| 800 | .00125 | 222 |
| 1,600 | .000625 | 444 |
| 3,200 | .000313 | 864 |
| 6,400 | .000157 | 1,560 |
| 11,250 | .0000892 | $2{,}000\left(a-2\frac{d}{v}\right)$ |

As the foregoing Equation (2) indicates, the pressure difference $P_d$ is a sine function of the frequency. However, from the above table of values it is apparent that, for practical purposes, particularly in the field of acoustics, the relation may be considered practically linear up to nearly the frequency of maximum pressure difference.

In order to obtain uniform response over the operating range of frequencies it is desirable to provide compensation for the above-mentioned increase in response as the frequency increases. In the preferred form of my apparatus I provide means for simultaneously altering the response of generator 1 and shifting the phase of the output of generator 1 relative to the output of generator 2. This response-correcting and phase-shifting means comprises condenser 29 of Fig. 6 and the plate resistance of vacuum tube 21 in combination with resistances 27 and 28a. Condenser 29 is of such capacity that its reactance at the lowest operating frequency is very small compared with the plate resistance of tube 21. The resistances 27 and 28a are very large compared with the highest operating impedance of condenser 29. Under these conditions the voltage developed across condenser 29 and hence the voltage applied to the grid of tube 22 decreases as the frequency increases providing substantially the necessary correction for the increase in response of generator 1. Also the voltage developed across condenser 29 over a wide range of frequencies is substantially 90 degrees out of phase with the voltage applied to the grid of tube 21 by generator 1. Hence the output of tube 22 for constant amplitude input varies inversely as the frequency varies and is 90 degrees out of phase with the output of generator 1. This decreasing response of the amplifier taken in combination with the increasing response with frequency of generators 1 and 1a results in a substantially uniform output of tube 22 as the frequency of fluid medium waves falling on generator 1 is varied. The output of generator 2 is amplified by vacuum tube 30 without otherwise being altered. And since the output of generator 2 is practically uniform with frequency, the output of tube 30 will be substantially uniform. The outputs of tubes 22 and 30 are combined in transformer 34.

By proper adjustment of potentiometer 28a in Fig. 6 the amplified and corrected output of generator 1 may be made equal in magnitude to the amplified output of generator 2 for waves arriving from either direction B or F of Figs. 7 and 8. Then for waves arriving from one of the above mentioned directions the outputs will cancel and for waves arriving from the opposite direction the outputs will combine to a value of twice that of either output alone.

From the foregoing description it will be seen that in cases where a non-directional pickup characteristic is required the generators 1, 1a may be disconnected or short circuited allowing the non-directional generator 2 to function alone, thus obviating the use of a separate microphone. Furthermore, since the generators 1 and 1a have maximum response to waves from two opposite directions as previously explained and have no response to waves approaching from directions at 90 degrees to the directions of maximum response my microphone may be used for bi-directional pickup by disconnecting generator 2. These results are secured in the apparatus as illustrated in Fig. 6 by moving the switch 35 to suitable positions, that is, to short circuit the generators 1, 1a, in the one case, and to short circuit the generator 2, in the other case.

It will be obvious that a microphone having bi-directional operating characteristics only can be produced by the use of a generator or generators such as the generators 1, 1a, the latter preferably being connected with an amplifying circuit including response correcting means such as the condenser 29.

As previously explained, the response of the generators 1, 1a rises with the frequency up to the point where the period of the wave becomes twice the time required for a wave to travel from one unit 3 to the other unit 3 of generator 1. At higher frequencies the response decreases reaching zero at twice the frequency of maximum response. Thus it can be seen that to obtain substantially uniform response with simple correcting means, such as condenser 29, generating units must be small enough to be placed one-half wave length apart at the highest operating frequency. Thus for a smooth response up to ten thousand cycles per second the space should be no greater than 0.65 inch. However, the theoretically optimum spacing specified can be departed from substantially and still secure reasonably satisfactory results since the response does not drop to zero until twice the optimum spacing is reached.

Since microphones in service are used with varying lengths of connecting cable, it is desirable, in some cases at least, to have the internal impedance of the bi-directional and non-directional generators equal so that various lengths of cable affect both generators equally. Since the impedance of generators 1 and 1a each comprise two generating units in series it is necessary to connect two generators 1 and 1a in parallel to obtain the same effective internal impedance as that of generator 2. Obviously other methods of connection can be employed. For instance, the generating units 3, 3 of generator 1 can be connected in parallel in opposed relation and the generating units of generator 1a likewise connected. Then, to maintain the impedance balance, generators 1 and 1a would be connected in series. Obviously more than one generator 2 can be employed in combination with larger numbers of generators 1, 1a, etc. For many uses, as for example in acoustical work, generating units of quite small size are required to permit the necessary close spacing of such units in order to secure a flat response over relatively wide ranges of frequency and I have found that the piezo-electric generator units of the sound cell type illustrated in Figs. 1, 2 and 3 admirably meet these requirements.

Figure 9:
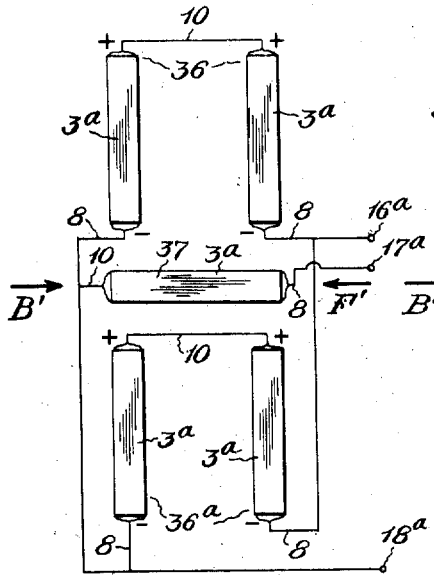
Figs. 9 and 10 are diagrammatic views of modified forms of microphone in which are employed generator units of the piezo-electric type but arranged differently than are the units of the microphone shown in Figs. 1, 2 and 3.

While the arrangement of the generator units shown in Figs. 1, 2 and 3 is such as I prefer, various other arrangements can be employed. Thus in the modified microphone shown in Fig. 9 the arrows $B^1$ and $F^1$ indicate the directions of the fluid medium waves for maximum response of the bi-directional generators 36 and 36a which have their generating units 3a, 3a disposed at right angles to the directions $B^1$, $F^1$ instead of parallel thereto, the generator 37 having its generating unit 3a disposed parallel to the directions $B^1$, $F^1$. The generators and their units are connected electrically as shown in Fig. 9 and the instrument has three terminals 16a, 17a, 18a corresponding to the terminals of the instrument shown in Fig. 6 and these terminals 16a, 17a and 18a may be connected with the amplifier circuit illustrated in Fig. 6. The construction of the units 3a is identical with that of the units 3 already described.

Figure 10:
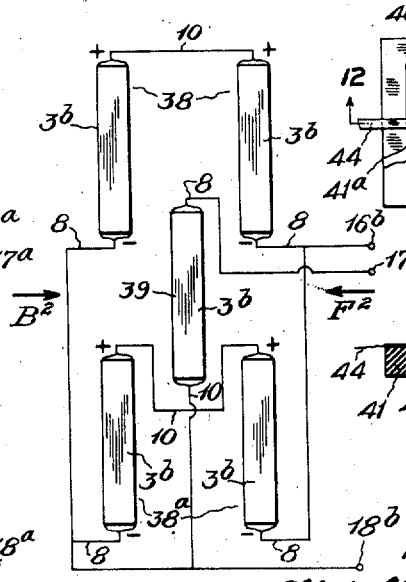

Similarly, with the modification shown in Fig. 10 the arrows $B^2$ and $F^2$ represent the directions of approach of the fluid medium waves for maximum response of the bi-directional generators 38 and 38a and in this case the non-directional generator 39, as well as the generating units 3b, 3b of the generators 38 and 38a, is disposed at right angles to the said directions. The terminals 16b, 17b and 18b of the microphone of Fig. 10 also may be connected to the amplifying circuit shown in Fig. 6.

Figure 4:
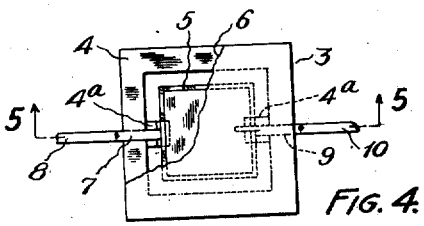
Fig. 4 is a plan view of one of the generator units of the microphone with a portion of the structure broken away to better show the construction.
Figure 5:
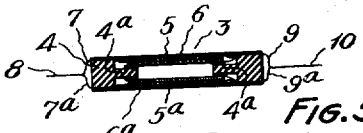
Fig. 5 is a section on the line 5—5 of Fig. 4.
Figure 11:
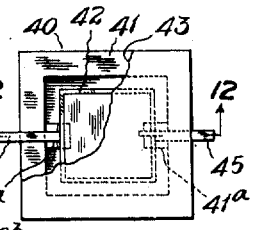
Fig. 11 is a plan view of a modified form of piezo-electric generator unit, with a portion of the structure broken away to better show details of construction.
Figure 12:
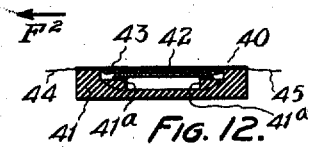
Fig. 12 is a section on the line 12—12 of Fig. 11.

While I prefer to employ sound cell generating units such as are shown in Figs. 4 and 5 in which two oppositely disposed crystalline generating elements are mounted on the same frame, it will be understood that sound cell units each employing a single crystalline generating element can be employed. I have shown a sound cell of this character in Figs. 11 and 12. Here the unit which is designated as an entirety by 40 comprises a cupped frame structure 41, a flexing crystalline element 42 of the same character as the elements 5, 5a in the previously described construction, and a flexible sheet 43 of paper or the like which is cemented to the element 42 and the edge part of the frame 41 so as to tightly enclose the crystalline element, said element being operatively supported upon lugs 41a on the frame 41. The element 42 has its electrodes provided with leads 44 and 45 corresponding to the leads 8 and 10 of the first described sound cell.

Figure 13:
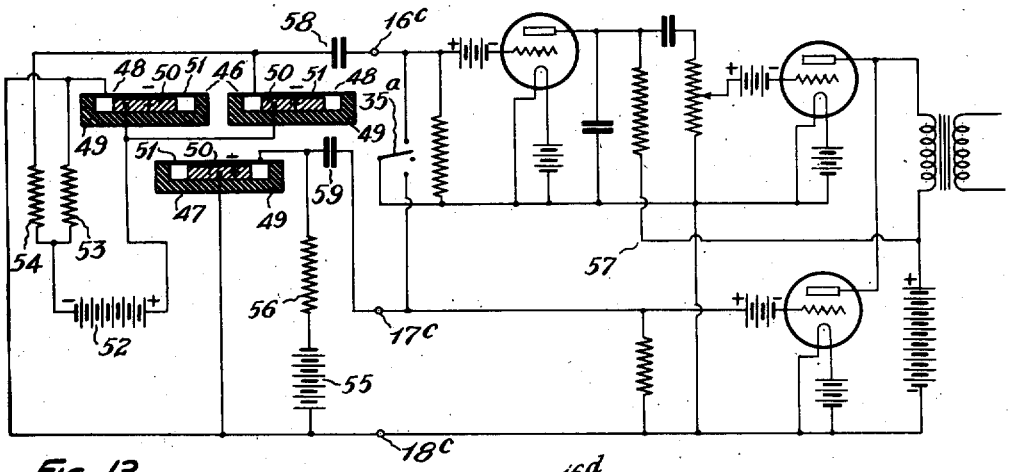
Fig. 13 is a diagram showing a microphone comprising generator units of the condenser type and a circuit comprising amplifying and modifying devices to which the microphone is connected.

In Fig. 13 I have shown another form of microphone embodying my invention. Here the generators are of the condenser type and the microphone comprises a bi-directional generator 46 and a non-directional generator 47. The latter generator and each of the two units 48, 48 of the generator 46 comprises a cup-shaped base or frame 49 formed of some suitable insulating material, a metallic back plate 50 and a diaphragm 51 which may be of metal or of some material such as mica provided with a conducting coating opposite the back plate 50. The edges of the diaphragm are tightly sealed to the top peripheral part of the base or frame 49. The operation of condenser type microphones is well known to persons familiar with the art. The diaphragms 51 and back plates 50 form electrical condensers whose capacities vary in accordance with the variations in fluid medium pressure acting on the diaphragms. Battery 52 electrically charges the capacities of the two generator units of generator 46 through resistances 53 and 54. It will be observed that battery 52 supplies similar charges to units 48, 48. The two units, however, are connected in series in opposed relation so that simultaneous increases or decreases in their capacities cause no resulting output. However, when they are actuated by fluid medium waves approaching from certain directions the instantaneous values of capacity of the two units will be different with resulting output. Battery 55 supplies an electrical charge for the capacity of generator 47 through resistance 56. Generator 47 is equally affected by waves from any direction or, in other words, is non-directional. The microphone has terminals 16c, 17c and 18c to which an amplifying circuit 57, similar to that of Fig. 6, is connected. Condensers 58 and 59 are provided to isolate batteries 52 and 55, respectively, from the amplifier without affecting the outputs of the generators.

It will be observed that the generating units 48, 48 of the generator 46 and the generating unit constituting generator 47 have the same kind of space relationship as the unit of the generators 1 and 2 of the first described microphone and the instrument of Fig. 13 operates in the same general way as that of Figs. 1, 2 and 3. That is to say, the microphone when connected in circuit as shown in Fig. 13 functions as a uni-directional instrument and by moving the switch 35a either the generator 46 may be short circuited to render the instrument non-directional or the generator 47 may be short circuited to render the instrument bi-directional.

Figure 16:
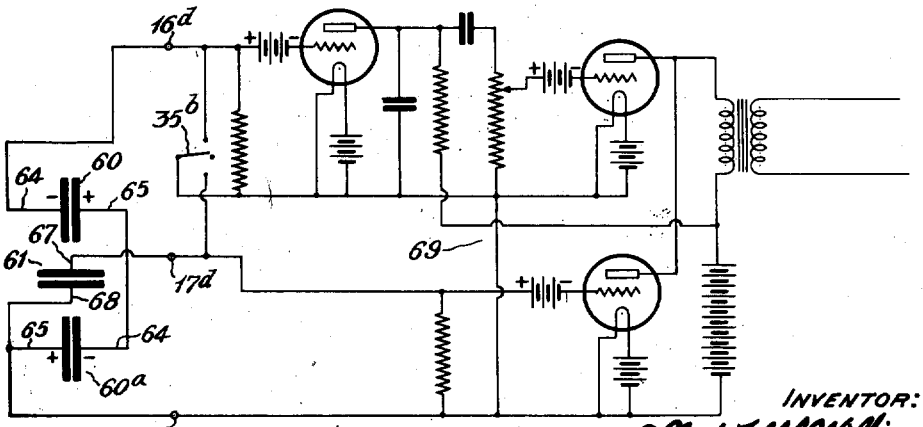
Fig. 16 is a diagrammatic view showing the generators of the microphone shown in Figs. 14 and 15 and a circuit comprising amplifying and modifying devices, to which the microphone is connected.

In Figs. 14, 15 and 16 I have illustrated still another form of uni-directional microphone in which piezo-electric crystalline generators are employed. Here the microphone consists of two bi-directional generators 60, 60a and a non-directional generator 61. Each of the generators 60, 60a consists essentially of a flexible crystalline element of the same character as the elements 5, 5a of the first described microphone, said element being mounted upon two opposite lugs 62a of a supporting frame 62 with interposed pads 63 of felt or the like. Each generating element of the generators 60, 60a are provided with terminal leads 64, 65 as shown in Fig. 14.

The generator 61 consists of a piezo-electric sound cell, such as is shown in Figs. 4 and 5 and need not be further described. This sound cell or generating unit is mounted in notches 62b of the frame 62 with interposed cushions 66. The generator 61 is provided with terminal leads 67 and 68 and the leads of the three generators are connected as shown in Figs. 14 and 16 to terminals 16d, 17d and 18d of the instrument. These terminals are in turn connected to an amplifying circuit 69 of the same charatcer as the amplifying circuit of Fig. 6. The circuit includes a three-position switch 35b. It will be observed that the generators 60, 60a of the microphone are connected in series in aiding relation, two generators being used to obtain greater output. The generators 60 and 60a each provides bi-directional response. This will become evident when it is considered that a wave arriving from any point in the plane of generators 60 and 60a will react on both surfaces of each of said generators equally and simultaneously, resulting in no flexure. Waves arriving from other directions will react on one surface of each generator before reacting on the other surface causing a flexure of the generators. The character of generators 60 and 60a is such that the maximum voltage is generated at the instant of maximum flexure. Maximum output will be obtained when the waves arrive from directions normal to the surface of the generators 60 and 60a. Thus it can be seen that they have the same bi-directional response as the units previously described.

In Fig. 17 I have illustrated graphically at H the pressure distribution of a fluid medium wave approaching the microphone of Fig. 14 from a direction indicated by the arrow J. This wave is shown at the instant of maximum pressure on generator 61. The faces of generator 61 are therefore shown in concave position in solid lines and the resulting polarities are also shown in solid lines. At the instant illustrated generators 60 and 60a are acted upon by equal pressures on their opposite faces and hence at this instant there is no flexure of these generators, as shown by solid lines. The dotted line at K illustrates the same wave one quarter cycle later. Generator 61 is now in a zone of zero pressure and its faces are shown in normal position in dotted lines. At this instant there is no output from generator 61 and so no polarity signs are shown. Generators 60 and 60a at the instant illustrated are acted upon by greater pressure from the right hand side than from the left hand side and their resulting flexure is shown in dotted lines. At instant shown the pressure difference is maximum and hence their outputs are maximum. Their polarities at this instant are also shown in dotted lines.

From the last preceding paragraph it can be seen that when terminal 18d is taken as a reference point terminal 16d reaches a maximum positive potential one-quarter cycle after terminal 17d reaches a maximum negative potential. In other words, the output of generator 61 leads the output of generators 60 and 60a by 270° or lags by 90°.

Fig. 18 presents a graph L of the pressure distribution of a fluid medium wave approaching the microphone of Fig. 14 from the direction indicated by arrow M. It represents the instant of maximum pressure on generator 61. The output of generator 61 is a maximum at this instant and of the same polarity as for similar conditions shown in Fig. 17. Generators 60 and 60a are acted upon equally on both faces and hence they do not flex at this instant. Dotted line N represents the pressure distribution one quarter cycle later. Generator 61 is now in a zero pressure zone and its faces are shown in normal position in dotted lines. Generators 60 and 60a are now acted upon by greater pressure on the left hand side than on the right and this difference in pressure is maximum at the instant shown and their resulting flexure is shown in dotted lines. Their polarities are also shown in dotted lines. The output of generators 60 and 60a is therefore maximum but opposite in polarity to the output for conditions shown in Fig. 17.

From the foregoing description, it is evident that when terminal 18d is taken as a reference point, terminal 16d reaches its maximum negative potential one-quarter cycle after terminal 17d reaches its maximum negative potential. In other words, the output of generator 61 leads the output of generators 60 and 60a by 90°, whereas under the conditions shown in Fig. 17 the output of generator 61 lags the output of generators 60 and 60a by 90°.

Retarding the electrical output of generators 60 and 60a by 90 degrees will bring their outputs in phase with the output of generator 61 for sound waves arriving from one direction and 180 degrees out of phase for sound waves arriving from the opposite direction.

Since both faces of each generator 60 and 60a are exposed to the fluid medium waves the deflection of these units at any instant is proportional to the instantaneous difference in pressure on opposite faces. For plane waves of constant amplitude the pressure differential between two points, as has previously been explained in connection with the tabulated values for Equation (2), for practical purposes increases substantially linearly with increase in frequency for frequencies less than some critical value depending upon the distance between the two points. Since the outputs of generators 60 and 60a are proportional to their flexures and their flexures are proportional to the pressure differential which in turn is substantially proportional to the frequency, their outputs are substantially proportional to the frequency. This is the same type of response obtained from generators 1 and 1a as explained in connection with Figs. 7 and 8.

Since the response of generators 60 and 60a depends on a difference in pressure on opposite faces the response will be zero for waves approaching 60 and 60a from any direction in the central plane of the units because from such directions waves act on both sides equally and simultaneously. The maximum response occurs for waves approaching from directions normal to the faces of generators 60 and 60a. Thus there are two directions of maximum response and a plane of zero response with intermediate values of response between, as in the case of the first described instrument. The output of generators 60 and 60a combined with the output of generator 61 provides uni-directional pickup in the same manner as do the bi-directional generators 1 and 1a and non-directional generator 2 of Figs. 1, 2 and 3.

Figure 15A:
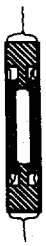
Fig. 15a is a sectional view of a generating unit of the piezo-electric type which is similar to the unit shown in Figs. 4 and 5 except that the electrical connections of the two crystal elements are modified.

As a modification of the construction shown in Figs. 14 and 15 the bi-directional generators 60, 60a may be replaced by generators of the sound cell type of construction such as shown in Fig. 15a. The construction of this generator is like that of the sound cell shown in Figs. 4 and 5 except that the two generating elements 5 and 5a are electrically connected in opposition as will be seen from a comparison of Fig. 15a with Fig. 5. Fluid medium waves arriving from directions in the plane of the generator flex the two piezoelectric elements equally and simultaneously but in opposite directions, and due to the manner in which the elements are connected their output waves cancel. Fluid medium waves arriving from other directions have different instantaneous effects on the two elements. The outputs therefore do not cancel and the resulting output is similar to the output of generators 60 and 60a of Fig. 14. Thus the operation of the microphone employing such reversed sound cells in lieu of the generators 60, 60a is the same as the operation of the microphone in Figs. 14 and 15.

In Fig. 19 I have shown a microphone operating in the same general way as the microphone shown in Figs. 14 and 15 but in which the generating units are of the condenser type. The microphone comprises a bi-directional generator 70 and a non-directional generator 71. The bi-directional generator comprises a frame 72 of suitable insulating material, a metallic back plate 73 mounted in the frame and formed with a number of perforations 73a to allow free passage of the fluid medium, and a diaphragm 74 of metal or of some such material as mica with a conducting coating opposite the back plate 73. The generator 71 comprises a frame 75 of insulating material, a metallic back plate 76 and a diaphragm 77, the construction of this generator being the same as that of the generating units of Fig. 13.

Diaphragm 74 and back plate 73 of generator 70 form a capacity which varies under the influence of fluid medium waves. Diaphragm 77 and back plate 76 of generator 71 also form a capacity whose value varies under the influence of fluid medium waves. Battery 78 applies electrical charges to the capacities of generators 70 and 71 through resistances 79 and 80. Since the back plate of generator 70 is perforated the generator will have bi-directional characteristics for the reasons explained in connection with generators 60 and 60a of Figs.17 and 18 as applied to the microphone of Figs. 14 and 15. Variations in the capacities of generators 70 and 71 under the influence of fluid medium waves cause alternating potentials to be applied to the terminals 16e, 17e and 18e. Condensers 81 and 82 are provided to isolate battery 78 from terminal 16e and 17e. These terminals are connected to amplifier circuit 83 which is of the same character as the amplifier circuit of Fig. 6. The circuit includes a three-position switch 35c by means of which either the generator 70 or the generator 71 can be short circuited so that the microphone will function non-directionally or bi-directionally as well as uni-directionally.

In Figs. 20, 21 and 22 I have illustrated a bi-directional generator in which two separate mechanical diaphragms are employed to actuate a single generator unit of the crystalline piezoelectric type. In this generator there is a flexing crystalline piezo generator element 84 of the twisting type disclosed in United States patent to Sawyer Reissue No. 20,680 (Fig. 10) to which reference may be made for a detailed description. In this type of generating element the response is due to a twisting of the element and is proportional to the amount of the twisting. This generator is provided with terminal leads 84a and 84b and is mounted in a casing comprising a cupped bottom section 85 and a cover plate 86 secured to the bottom section by means of cap screws 87, the parts 85 and 86 being formed of suitable insulating material. The generating element is supported from the bottom of the case by means of a centrally disposed block 88 and two corner blocks 89, 89, these blocks being preferably formed of some material such as rubber, the blocks being cemented to the case and to the crystal element. The free corners of the plate-like crystal element carry blocks 90, 90 to which are attached circular diaphragms 91, 91, the peripheries of which rest upon and are cemented to the edges of circular apertures 86a in the top plate 86.

When the diaphragms 91, 91 are acted upon by different pressures a twisting flexure of the crystalline element 84 results. When diaphragms 91, 91 are acted upon simultaneously by the same pressure no twisting flexure results. Accordingly fluid medium waves arriving from directions parallel to a line joining the centers of the diaphragms act upon the two diaphragms with different forces as shown in connection with the first described generator of Figs. 7 and 8. This difference in force results in a twisting motion of the crystalline element causing the generation of corresponding electrical output. Fluid medium waves reaching the generator from directions 90 degrees from the above mentioned directions act on the two diaphragms equally and simultaneously and produce minimum output. Thus it will be seen that this generator has the same bi-directional characteristics as those previously described and may be combined with non-directional generators for uni-directional reception where desired.

As will readily be understood by those skilled in such matters, other forms of amplifying circuit than those illustrated can be employed in connection with my improved microphone. In the circuits illustrated and described I have employed a condenser, as the condenser 29 in Fig. 6, which cooperates with the plate resistance of an amplifying tube to shift the phase and alter the response of the bi-directional generator or generators after the output of that generator has been partially amplified. It will be obvious that this phase shifting and modifying function can be performed before any amplification of the output of the bi-directional generators by the provision of suitable known means for that purpose and, furthermore, the output of the non-directional generator may be combined with the altered output of the bi-directional generator before amplification.

My improved microphones, operating in the manner above described, are adapted for use in the carrying out of my improved method of generating electrical waves. The design of the microphone, and more particularly of the bi-directional generator thereof, involves the selection of adjacent zones which are defined by the diaphragms of the bi-directional generator. When fluid medium waves act upon the diaphragms the fluid medium pressures thereon are utilized to generate electrical waves in the manner previously described.

I prefer to design the bi-directional generators so that the zones defined by their diaphragms are disposed in relation to each other so that the maximum time required for a fluid medium wave to travel from a common point of one of said zones to a corresponding point of the other zone is less than the period of the shortest wave within the range of frequencies for which the electrical waves are to be generated. By means of the bi-directional generator the different instantaneous wave pressures of the fluid medium in the two zones is utilized to generate electrical waves whose instantaneous values are proportional to the differences between the said pressures, and the waves so generated are then passed through a circuit whose transmission efficiency varies inversely as the frequency within the said range of frequencies so that within the said range a generating efficiency relatively uniform with respect to frequency is attained for fluid medium waves approaching from any given direction.

It will further be seen that the arrangement of the non-directional generating unit of my improved microphone involves the selction of a third zone of the fluid medium and when the instantaneous wave pressures in this third zone corresponding to the differing pressures of the two zones of the bi-directional generator are utilized to generate electrical waves and the waves generated by the two generators are combined in phase for fluid medium waves approaching the zones from one direction, a generation of electrical waves uniformly efficient with respect to frequency is attained and the response varies from a maximum for fluid medium waves approaching from one direction to a minimum for fluid medium waves approaching from the opposite direction.

I have shown and described the preferred procedure in practicing my improved method and preferred forms of construction of my improved microphone and associated devices but it will be understood that other specific procedures and other forms of construction and arrangement of the apparatus and its parts can be employed in carrying out my invention as defined in the appended claims.

What I claim is:

1. The method of generating electrical waves corresponding to fluid medium waves within a given range of frequencies which comprises selecting two zones of the fluid medium disposed in relation to each other so that the maximum time required for one of the fluid medium waves to travel from a given point of one of said zones to a corresponding point of the other zone is less than the period of the shortest wave within the said range of frequencies, utilizing the different instantaneous wave pressures of the fluid medium in the said zones to generate electrical waves whose corresponding instantaneous voltage values are proportional to the differences between the said pressures, utilizing the corresponding instantaneous wave pressures in a third zone of the fluid medium to generate electrical waves whose instantaneous voltage values are proportional to the instantaneous wave pressures in said third zone, and combining the two sets of electrical waves so generated so that they are substantially in phase for fluid medium waves within the said range approaching the said zones from one direction.

2. The method of generating electrical waves corresponding to fluid medium waves within a given range of frequencies which comprises selecting two zones of the fluid medium disposed in relation to each other so that the maximum time required for one of the fluid medium waves to travel from a given point of one of said zones to a corresponding point of the other zone is less than the period of the shortest wave within the said range of frequencies, utilizing the different instantaneous wave pressures of the fluid medium in the said zones to generate electrical waves whose instantaneous voltage values are proportional to the differences between the said pressures, passing the last named waves so generated through a circuit whose voltage transmission efficiency varies substantially inversely as the frequency within the said range of frequencies, utilizing the corresponding instantaneous wave pressures in a third zone of the fluid medium to generate electrical waves whose instantaneous voltage values are proportional to the instantaneous wave pressures in said third zone, and combining the last named waves and the waves passed through the said circuit so that the waves of the two sets of waves are substantially in phase for fluid medium waves within the said frequency range approaching the said zones from one direction.

3. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are proportional to the differences between the corresponding instantaneous fluid medium pressures on said diaphragm surfaces, a second generator associated with the first named generator and adapted to generate electrical waves corresponding to the fluid medium waves approaching it from any direction, the phase angle between the output voltage waves of the two generators being substantially greater than zero and substantially less than 180°, and a circuit to which the two generators are connected comprising means adapted, within the said range of frequencies and when the generators are generating electrical waves corresponding to fluid medium waves approaching the apparatus from a given direction, to shift the phase angle between said output voltage waves to substantially 180° and combine the said waves in the latter phase relation.

4. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are proportional to the differences between the corresponding instantaneous fluid medium pressures on said diaphragm surfaces, a second generator associated with the first named generator and adapted to generate electrical waves corresponding to the fluid medium waves approaching it from any direction, and a circuit to which the two generators are connected comprising means adapted, within the said range of frequencies, to render the response of the first generator substantially uniform and to combine the outputs of the generators substantially 180° out of phase with each other when the generators are generating electrical waves corresponding to fluid medium waves approaching the apparatus from a given direction.

5. In apparatus for generating electrical waves corresponding to fluid medium waves within a given range of frequencies, the combination of a generator having a pair of diaphragms sensitive to the fluid medium waves so disposed in relation to each other that the maximum time required for a fluid medium wave to travel from a given point of one of said diaphragms to a corresponding point of the other diaphragm is less than the period of the shortest wave within said range of frequencies, said generator being adapted to generate electrical waves whose instantaneous voltage values are proportional to the differences between the corresponding instantaneous fluid medium pressures on said diaphragms, a second enerator associated with the first named generator and adapted to generate electrical waves corresponding to the fluid medium waves approaching it from any direction, and a circuit to which the two generators are connected comprising means adapted, within the said range of frequencies, to combine the outputs of the generators substantially 180° out of phase with each other when the generators are generating electrical waves corresponding to fluid medium waves approaching the apparatus from a given direction.

6. In apparatus for generating electrical waves corresponding to fluid medium waves within a given range of frequencies, the combination of a generator comprising a pair of generating units each having a diaphragm sensitive to the fluid medium waves, the diaphragms of the two units being so disposed in relation to each other that the maximum time required for one of said waves to travel from a given point of one of said diaphragms to a corresponding point of the other diaphragm is less than the period of the shortest wave within the said range of frequencies, the said generating units being connected in opposed electrical relation and each being adapted to generate electrical waves corresponding to the fluid medium waves, a second generator associated with the first named generator and adapted to generate electrical waves corresponding to the fluid medium waves approaching it from any direction, and a circuit to which the two generators are connected comprising means adapted, within said range of frequencies, to combine the outputs of the generators substantially 180° out of phase with each other when the generators are generating electrical waves corresponding to fluid medium waves approaching the apparatus from a given direction.

7. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are proportional to the differences between the corresponding instantaneous fluid medium pressures on said diaphragm surfaces, a second generator adapted to generate electrical waves corresponding to the fluid medium waves approaching it from any direction and so disposed in relation to the first generator that the fluid pressure upon it is zero when the difference in the pressures on the diaphragm surfaces of the first generator is a maximum, and a circuit to which the two generators are connected comprising means adapted, within the said range of frequencies, to shift the phase relation between the electrical waves of the two generators substantially 90 degrees and to combine the said waves.

8. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are proportional to the differences between the corresponding instantaneous fluid medium pressures on said diaphragm surfaces, a second generator associated with the first named generator and adapted to generate electrical waves corresponding to the fluid medium waves approaching it from any direction, a circuit to which the two generators are connected comprising means adapted, within the said range of frequencies, to combine the outputs of the generators substantially 180° out of phase with each other when the generators are generating electrical waves corresponding to fluid medium waves approaching the apparatus from a given direction, and means for electrically disconnecting one of the two generators from the circuit without disconnecting the other.

9. In apparatus for generating electrical waves corresponding to fluid medium waves within a given range of frequencies, the combination of a pair of generators each comprising two generating units each of which has a diaphragm sensitive to the fluid medium waves, the diaphragms of the two units being so disposed in relation to each other that the maximum time required for one of said waves to travel from a given point of one of said diaphragms to a corresponding point of the other diaphragm is less than the period of the shortest wave within the said range of frequencies, the said units of each generator being connected in opposed electrical relation and each being adapted to generate electrical waves corresponding to the fluid medium waves, and a third generator having a diaphragm sensitive to the fluid medium waves and adapted to generate electrical waves corresponding to the fluid medium waves approaching it from any direction, the three generators being disposed in spaced relation one above the other with their diaphragms substantially parallel and with the diaphragms of one of the two-unit generators substantially in vertical alignment with the diaphragms of the other two-unit generator and with the diaphragm of the third generator symmetrically disposed in relation to a plane midway between, and normal to the planes of, the diaphragms of the two-unit generators.

10. In apparatus for generating electrical waves corresponding to fluid medium waves within a given range of frequencies, the combination of a pair of generators each comprising two generating units each of which has a diaphragm sensitive to the fluid medium waves, the diaphragms of the two units being so disposed in relation to each other that the maximum time required for one of said waves to travel from a given point of one of said diaphragms to a corresponding point of the other diaphragm is less than the period of the shortest wave within the said range of frequencies, the said units of each generator being connected in opposed electrical relation and each being adapted to generate electrical waves corresponding to the fluid medium waves, a third generator having a diaphragm sensitive to the fluid medium waves and adapted to generate electrical waves corresponding to the fluid medium waves approaching it from any direction, the three generators being disposed in spaced relation one above the other with their diaphragms substantially parallel and with the diaphragms of one of the two-unit generators substantially in vertical alignment with the diaphragms of the other two-unit generator and with the diaphragm of the third generator symmetrically disposed in relation to a plane midway between, and normal to the planes of, the diaphragms of the two-unit generators, and a circuit to which the three generators are connected comprising means adapted, within the said range of frequencies, to shift the phase relation between the electrical waves of the third generator and those of the two two-unit generators substantially 90 degrees and to combine the said waves.

11. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are substantially proportional to the differences between the corresponding instantaneous fluid medium pressures on said diaphragm surfaces, a second generator adapted to generate electrical waves corresponding to the fluid medium waves approaching it from any direction and so disposed in relation to the first generator that the fluid pressure upon it is zero when the difference in the pressures on the diaphragm surfaces of the first generator is a maximum, and a circuit to which the two generators are connected comprising means adapted, within the said range of frequencies, to render the response of the first generator substantially uniform and to shift the phase relation between the electrical waves of the two generators substantially 90° and to combine the said waves.

12. In apparatus for generating electrical waves corresponding to fluid medium waves within a given range of frequencies, the combination of a generator comprising a pair of generating units each having a diaphragm sensitive to the fluid medium waves, the diaphragms of the two units being so disposed in relation to each other that the maximum time required for one of said waves to travel from a given point of one of said diaphragms to a corresponding point of the other diaphragm is less than the period of the shortest wave within the said range of frequencies, the said generating units being connected in opposed electrical relation and each being adapted to generate electrical waves corresponding to the fluid medium waves, a second generator adapted to generate electrical waves corresponding to the fluid medium waves approaching it from any direction and so disposed in relation to the first generator that the fluid pressure upon it is zero when the difference in pressures on the generating units of the first generator is a maximum, and a circuit to which the two generators are connected comprising means adapted, within the said range of frequencies, to shift the phase relation between the electrical waves of the two generators substantially 90° and to combine the said waves.

13. In apparatus for generating electrical waves corresponding to fluid medium waves within a given range of frequencies, the combination of a generator comprising a pair of generating units each having a diaphragm sensitive to the fluid medium waves, the diaphragms of the two units being so disposed in relation to each other that the maximum time required for one of said waves to travel from a given point of one of said diaphragms to a corresponding point of the other diaphragm is less than the period of the shortest wave within the said range of frequencies, the said generating units being connected in opposed electrical relation and each being adapted to generate electrical waves corresponding to the fluid medium waves, a second generator adapted to generate electrical waves corresponding to the fluid medium waves approaching it from any direction and so disposed in relation to the first generator that the fluid pressure upon said second generator is zero when the difference in the pressures on the diaphragm surfaces of the first generator is a maximum, and a circuit to which the two generators are connected comprising means adapted, within the said range of frequencies, to render the response of the first generator substantially uniform and to shift the phase relation between the electrical waves of the two generators substantially 90° and to combine the said waves.

14. In apparatus for generating electrical waves corresponding to fluid medium waves within a given range of frequencies with maximum generation for fluid medium waves approaching from a given direction, the combination of a generator comprising a pair of generating units each having a diaphragm sensitive to the fluid medium waves, the two units being so disposed in relation to each other that the center to center distance between diaphragms of the two units is less than the length of the shortest waves within said range of frequencies and the said generating units being connected in opposed electrical relation and each being adapted to generate electrical waves corresponding to the fluid medium waves; a second generator adapted to generate electrical waves corresponding to the fluid medium waves approaching it from any direction and so disposed in relation to the first generator that the fluid pressure upon it is zero when the difference in the pressures on the diaphragms of the first generator is a maximum; and a circuit to which the two generators are connected comprising means adapted, within the said range of frequencies, to shift the phase relation between the electrical waves of the two generators substantially 90° and to render the response of the first generator substantially uniform over the said range of frequencies and to combine the said waves.

15. In a directional microphone for operation over a given range of frequencies, the combination of a bi-directional microphone having response substantially proportional to frequency within the given range of frequencies, a second microphone sensitive to fluid medium waves approaching it from any direction and whose response is substantially uniform with respect to frequency within the given range of frequencies, the two microphones being so disposed in relation to each other that their electrical outputs are substantially 90° out of phase over the given range of frequencies, electrical circuit means connected to the bi-directional microphone and adapted to render the output of the bi-directional microphone substantially uniform and to shift the phase of said output by substantially 90°, and means for combining the output of the second microphone and the altered output of the bi-directional microphone.

16. In a directional microphone for operation over a given range of frequencies, the combination of a bi-directional microphone having response substantially proportional to frequency within the given range of frequencies, a second microphone sensitive to fluid medium waves approaching it from any direction and whose response is substantially uniform with respect to frequency within the given range of frequencies, the two microphones being so disposed in relation to each other that their electrical outputs are substantially 90° out of phase over the given range of frequencies, electrical circuit means connected to the bi-directional microphone and adapted to render the output of the bi-directional microphone substantially uniform and to shift the phase of said output by substantially 90°, and switching means adapted alternatively to select the output of the bi-directional microphone or the output of the second microphone or to combine the outputs of both microphones.

17. In apparatus for generating electrical waves corresponding to fluid medium waves, the combination of a generator comprising diaphragm means having a pair of surfaces sensitive to the fluid medium waves, said generator being adapted to generate electrical waves whose instantaneous voltage values are proportional to the differences between the corresponding instantaneous fluid medium pressures on said diaphragm surfaces, a second generator associated with the first named generator and adapted to generate electrical waves corresponding to the fluid medium waves approaching it from any direction, the phase angle between the output voltage waves of the two generators being substantially greater than zero and substantially less than 180°, and a circuit to which the two generators are connected comprising means adapted, when the generators are generating electrical waves corresponding to fluid medium waves approaching the apparatus from a given direction, to shift the phase angle between said output voltage waves to substantially 180° and combine the said waves in the latter phase relation.

18. In apparatus for generating electrical waves corresponding to fluid medium waves, the combination of a generator comprising diaphragm means having a pair of surfaces sensitive to the fluid medium waves, said generator being adapted to generate electrical waves whose instantaneous voltage values are proportional to the differences between the corresponding instantaneous fluid medium pressures on said diaphragm surfaces, a second generator adapted to generate electrical waves corresponding to the fluid medium waves approaching it from any direction and so disposed in relation to the first named generator that the fluid pressure upon it is zero when the difference in the pressures on the diaphragm surfaces of the first generator is a maximum, and a circuit to which the two generators are connected comprising means adapted to shift the phase relation between the electrical waves of the two generators substantially 90 degrees and to combine the said waves.

19. In apparatus for generating electrical waves corresponding to fluid medium waves within a given range of frequencies, the combination of a generator comprising diaphragm means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves whose instantaneous voltage values are proportional to the differences between the corresponding instantaneous fluid medium pressures on said diaphragm surfaces, a second generator adapted to generate electrical waves corresponding to the fluid medium waves approaching it from any direction and so disposed in relation to the first named generator that their electrical outputs are substantially 90 degrees out of phase with each other over a given range of frequencies, and a circuit to which the two generators are connected comprising means adapted, within the said range of frequencies, to combine the outputs of the generators substantially 180° out of phase with each other when the generators are generating electrical waves corresponding to fluid medium waves approaching the apparatus from a given direction.

20. In apparatus for generating electrical waves corresponding to fluid medium waves, the combination of a bi-directional generator comprising means having a pair of surfaces sensitive to fluid medium waves, said generator being adapted to generate electrical waves in response to variations in the difference between the fluid medium pressures on said surfaces, a second generator associated with the first named generator and adapted to generate electrical waves in response to fluid medium waves approaching it from any direction, circuit means for combining the outputs of the generators substantially 180° out of phase with each other when the generators are generating electrical waves in response to the fluid medium waves approaching the apparatus from a given direction, and switching means for cutting out at will one of the two generators, whereby the directional characteristic of the other generator or the directional characteristic of the combined generators may be selected alternatively.

21. In apparatus for generating electrical waves corresponding to fluid medium waves, the combination of a bi-directional generator comprising means having a pair of surfaces sensitive to fluid medium waves, said generator being adapted to generate electrical waves in response to variations in the difference between the fluid medium pressures on said surfaces, a second generator adapted to generate electrical waves in response to the fluid medium waves approaching it from any direction and so disposed in relation to the first named generator that the fluid pressure upon it is zero when the difference in the pressures on the said surfaces of the first generator is a maximum, circuit means for combining the outputs of the generators substantially 180° out of phase with each other when the generators are generating electrical waves in response to the fluid medium waves approaching the apparatus from a given direction, and switching means for cutting out at will one of the two generators, whereby the directional characteristic of the other generator or the directional characteristic of the combined generators may be selected alternatively.

22. In apparatus for generating electrical waves corresponding to fluid medium waves within a given range of frequencies, the combination of a generator comprising means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves in response to variations in the difference between the fluid medium pressures on said surfaces, a second generator associated with the first named generator and adapted to generate electrical waves corresponding to the fluid medium waves approaching it from any direction, circuit means to which the two generators are connected adapted, within said range of frequencies, to combine the outputs of the generators substantially 180° out of phase with each other while the generators are generating electrical waves in response to fluid medium waves approaching the apparatus from a given direction, and switching means for cutting out at will one of the two generators, whereby the directional characteristic of the other generator or the directional characteristic of the combined generators may be selected alternatively.

23. In apparatus for generating electrical waves corresponding to fluid medium waves within a given range of frequencies, the combination of a generator comprising means having a pair of surfaces sensitive to the fluid medium waves and so disposed in relation to each other that the maximum time required for one of said waves to travel from a given point of one of said surfaces to a corresponding point of the other surface is less than the period of the shortest wave within the said range of frequencies, said generator being adapted to generate electrical waves in response to variations in the difference between the fluid medium pressures on said surfaces, a second generator adapted to generate electrical waves corresponding to the fluid medium waves approaching it from any direction and so disposed in relation to the first generator that the fluid pressure upon it is zero when the difference in the pressures on the diaphragm surfaces of the first generator is a maximum, circuit means to which the two generators are connected adapted, within said range of frequencies, to combine the outputs of the generators substantially 180° out of phase with each other when the generators are generating electrical waves in response to the fluid medium waves approaching the apparatus from a given direction, and switching means for cutting out at will one of the two generators, whereby the directional characteristic of the other generator or the directional characteristic of the combined generators may be selected alternatively.

ALFRED L. W. WILLIAMS.